United States Patent [19]
Rifkin et al.

[11] Patent Number: 5,894,536
[45] Date of Patent: Apr. 13, 1999

[54] IN-LINE FIBER OPTIC SPLICE PROTECTIVE DEVICE

[75] Inventors: David S. Rifkin, Aurora, Ill.; Donald W. Duda, Williams Bay, Wis.

[73] Assignee: Amphenol Corporation, Wallingford, Conn.

[21] Appl. No.: 08/800,462

[22] Filed: Feb. 14, 1997

[51] Int. Cl.$^6$ ............................................. G02B 6/255
[52] U.S. Cl. ................................................. 385/99; 385/96
[58] Field of Search ................................. 385/95–99, 135

[56] References Cited

U.S. PATENT DOCUMENTS

| | | | |
|---|---|---|---|
| 2,761,892 | 9/1956 | Newell | 174/92 |
| 3,144,506 | 8/1964 | Gunthel, Jr. | 174/71 |
| 3,151,211 | 9/1964 | Reid et al. | 174/72 |
| 3,441,659 | 4/1969 | Laudig et al. | 174/88 |
| 4,196,965 | 4/1980 | Matsuno | 385/96 |
| 4,512,628 | 4/1985 | Anderton | 385/135 |
| 4,714,316 | 12/1987 | Moore et al. | 385/99 |
| 4,773,724 | 9/1988 | Bjornlie | 385/86 |
| 4,773,728 | 9/1988 | Kershaw | 385/99 |
| 4,925,266 | 5/1990 | Huebscher et al. | 385/78 |
| 4,953,940 | 9/1990 | Lanzetta, Jr. et al. | 385/77 |
| 5,042,902 | 8/1991 | Huebscher et al. | 385/72 |
| 5,241,611 | 8/1993 | Gould | 385/70 |
| 5,341,448 | 8/1994 | Huebscher | 385/97 |
| 5,390,272 | 2/1995 | Repta et al. | 385/87 |
| 5,416,873 | 5/1995 | Huebscher et al. | 385/99 |
| 5,642,451 | 6/1997 | Kennedy et al. | 385/99 |

*Primary Examiner*—Hemang Sanghavi
*Attorney, Agent, or Firm*—Bacon & Thomas, PLLC

[57] ABSTRACT

An in-line protection device for protecting fiber optic splices is disclosed. The device includes a rigid body having a central section with an opening sized to receive and house a fiber optic splice between two optical fibers from two fiber optic cables and an end portion having open ends to receive the optical fiber from the fiber optic cable. The fiber optic cables are connected to the rigid body by crimping a sleeve onto the cable and the end portion of the body. A strain relief device is placed over the end portion of the body and fiber optic cable to provide strain relief at either end of the splice protector.

11 Claims, 2 Drawing Sheets

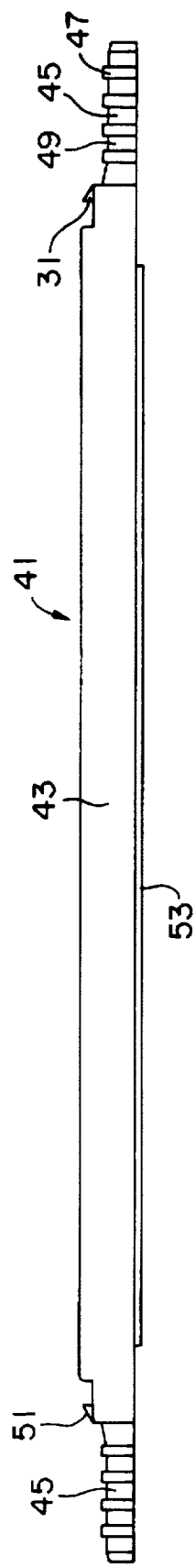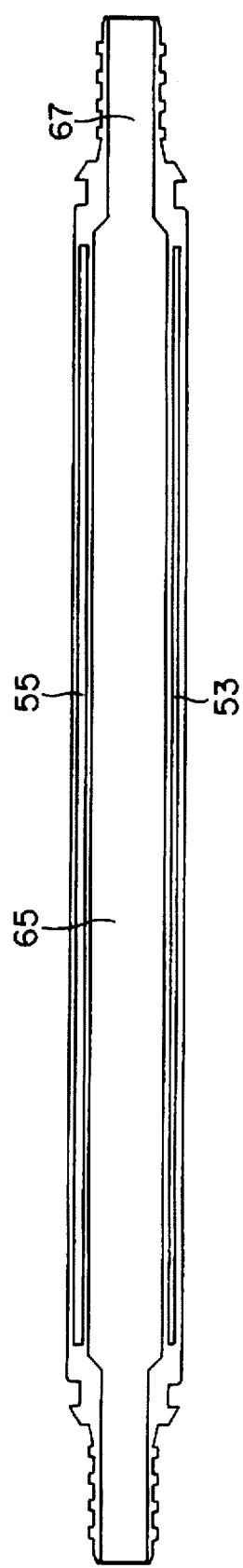

IN-LINE FIBER OPTIC SPLICE PROTECTIVE DEVICE

BACKGROUND OF THE INVENTION

1. Field of the Invention

This invention is directed to a device which protects optical fibers which have been spliced, particularly fusion spliced optical fibers. The device is particularly useful for protecting fusion spliced optical fibers in-line, without the need for splice trays or cabinets.

2. Description of the Prior Art

In fiber optic systems it is often necessary to connect optical fibers from different fiber optic cables by splicing the fibers together. Typically this is done by the known means of fusion splicing in which the ends of two optical fibers are placed in an end-to-end abutting relationship and fused together through electrical pulsing, also known as arcing.

Since it is necessary to strip away the outer jacket of the fiber optic cable, strength members and buffer in order to expose the bare optical fiber for fusion splicing, the resulting spliced fibers need protection from adverse environmental and physical forces. Typically, the protection is achieved by placing the splice in a tray or cabinet which allows the splice to be enclosed within and secured to a container and, therefore, protected from adverse environmental and physical forces.

Unfortunately, it is not always possible or desirable to splice optical fibers together in locations which are convenient for splice trays and cabinets. For example, should a fiber optic cable break, it may be necessary to connect the fibers by in-line splices at a remote location. In such cases, it is not convenient or even possible to utilize splice trays or cabinets for this purpose. There is, therefore, a need for a device which will protect spliced optical fibers in-line at a variety of points in a fiber optic system.

SUMMARY OF THE INVENTION

It is an object of the invention to provide an optical fiber splice protection device which may be used to protect in-line splices at many points in a fiber optic system.

It is a further object of the invention to provide a fiber optic splice protection device which is more easily assembled, particularly in field installations.

These objects and other advantages of the invention are provided by an in-line fiber optic splice protection device comprising a rigid body member having a central portion with an opening size to receive and house a fiber optic splice between two optical fibers from two fiber optic cables. In addition to the central portion, the rigid body member has two end portions having openings to receive an optical fiber from a fiber optic cable to be spliced. Fastening means are provided for fastening each fiber optic cable to each end portion of the rigid body member and strain relief means are connected to each end portion of the rigid body member and extend over the fastening means and a portion of the fiber optic cable adjacent the end portion of the rigid body member to provide strain relief for the fiber optic cable which is connected to the end portion of the rigid body member.

Other advantageous features of the invention will be evident to those of skill in the art upon studying the detailed description of the preferred embodiment which follows.

BRIEF DESCRIPTION OF THE FIGURES OF DRAWINGS

FIG. 4 is a perspective, side view of one of the rigid body sections which form the rigid body member in the in-line splice protection device of the invention.

FIG. 5 is the rigid section shown in FIG. 4 rotated through 90° to show its inner surface.

DETAILED DESCRIPTION OF THE PREFERRED EMBODIMENT

Figure 1:
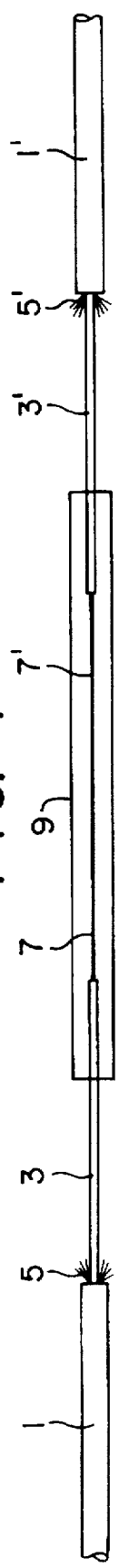
FIG. 1 is a perspective view of a conventional fusion splice between two optical fibers of two optical fiber cables.

FIG. 1 shows a conventional fusion splice of two optical fibers from two fiber optic cables. Fiber optic cables 1,1' contain at least one buffered optical fiber 3,3' and strength members 5,5' such as Kevlar® or other high strength fiber material. The splice is formed by stripping the buffer from the end of each optical fiber to produce bare fiber 7,7' which is fusion spliced by well-known techniques. A protective sleeve 9 is placed around the fusion spliced bare fiber, overlapping a portion of the buffered fiber. The protective sleeve may be formed from heat shrink plastic tubing or other plastic protective sleeves such as the ULTRAsleeve which is a rigid plastic housing comprised of two halves that fold along a hinge to close around the fusion spliced fiber. The ULTRAsleeve contains an acrylic foam tape on its inside surface to seal against environment affects.

Figure 2:
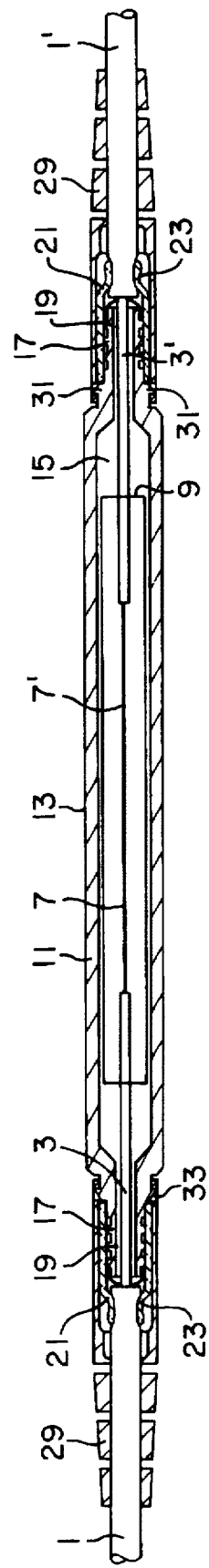
FIG. 2 is a cross-sectional view of the in-line splice protection device of the invention.

FIG. 2 shows a cross-section of the in-line splice protection device of the invention containing the fusion spliced optical fibers and cables of FIG. 1. The device includes a rigid body member 11, preferably made of a rigid plastic material or die-cast metal, and most preferably an injection molded polymer material such as polybutylene terephthalate (PBT) sold under the tradenames Delrin™ and Valox™, reinforced with up to 20% by weight of glass fibers. Rigid body member 11 includes a central portion 13 having an opening 15 sized to accommodate the protection sleeve 9 containing the fusion spliced optical fiber 7,7'.

The rigid body member 11 includes end portions 17 having openings 19 which receive buffered optical fibers 3,3' from optical fiber cables 1,1'. The rigid body member is fastened to the fiber optic cables by means of a crimp sleeve 21. One end of the crimp sleeve 23 is crimped to the outer jacket of the fiber optic cable and the other end is crimped onto end portion 17 of the rigid body member with strength members 5,5' from cables 1,1' placed between the crimp sleeve and end portion. The crimp sleeve is typically made of deformable metal such as copper or aluminum. Strain relief devices 29, such as a flexible, elastomeric plastic boot is placed over the crimp sleeve and an adjacent portion of the fiber optic cables. Each boot is held in portion over the crimp sleeve by projection 31 which enters an aperture 33 on either side of the forward portion of the boot.

Figure 3:
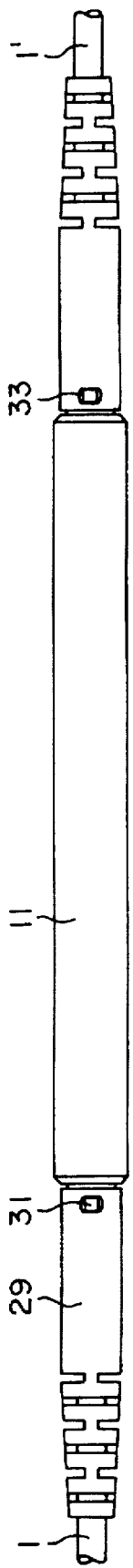
FIG. 3 is a perspective of the in-line splice protection device of the invention.

FIG. 3 shows a perspective view of the in-line splice protection device of the invention showing rigid body member 11, strain relief means 29 with aperture 33 receiving projection 31 from the end portion of the rigid body member.

The rigid body member is preferably formed by two identical pieces which are joined together around the spliced optical fiber. FIGS. 4 and 5 show two different views of one of the two rigid sections 41, which is joined with an identical piece to form the rigid body member. As depicted in FIG. 4, rigid section 41 includes central portion 43 and end portions 45. End portions 45 preferably include a series of ridges 47 and valleys 49 which increase the strength of the crimp connection by crimp sleeve 21 by forcing strength members 5.5' from fiber optic cables 1.1' in the valleys between successive ridges when the sleeve is crimped onto the end portions of the rigid body member. (See FIG. 2.)

FIG. 4 also shows projection 31 for attaching strain relief means 29 through aperture 31. (See FIG. 3.) Projection 31 preferably includes a ramped surface 51 to facilitate the sliding of the strain relief means thereover until the projection enters the aperture. Longitudinal projection 53 extends along one edge of rigid section 41.

FIG. 5 illustrates rigid section 43, rotated 90° to show its inner surface. In addition to the parts previously identified with respect to FIG. 4, FIG. 5 shows opening 65 which when mated with a companion rigid section form opening 15 for receiving the fusion spliced optical fiber assembly and openings 67 in end portions 45 which when mated with a companion rigid section form opening 19 for buffered optical fiber 3,3'. (See FIG. 2.) Longitudinal projection 53 and longitudinal groove 55 run along opposite edges of the central portion of the rigid section and mate with a corresponding longitudinal projection and groove in a companion rigid section to form the rigid body member.

To further illustrate the invention, the following examples are provided, it being understood that their purpose is entirely illustrative and are in no way intended to limit the scope of the invention.

EXAMPLE 1

Fusion Splice Assembly Procedure

A strain relief boot and crimp sleeve are placed over the end of each fiber optic cable to be spliced, small diameter end first. The outer jacket is removed from each cable, the strength member is trimmed and the buffer is removed from a portion of the end of each optical fiber. The bare fibers are then cleaved to the proper length.

The bare fibers are cleaned with isopropyl alcohol and loaded into a convention fusion splicing apparatus to form the fusion splice as is well known in the art.

The fusion spliced fiber structure is placed into a protective sleeve such as a heat shrink tube or the commercially available ULTRAsleeve mechanical fusion splice protection device to form the fusion spliced assembly.

EXAMPLE 2

Assembly of In-Line Splice Protection Device

The fusion spliced assembly prepared in Example 1 is placed in the opening in the central portion of one exposed half of the rigid body. The strength member from each fiber optic cable is pulled such that it is on the outside of the rigid body piece. The buffered fiber extends out of the opening in each end portion of the rigid body piece, not over the side. The companion rigid body piece is placed onto the first piece with the longitudinal projections fitting into the longitudinal grooves along the edges of each piece to insure proper mating. Buffered fiber from the splice assembly exits each opening in the end portions of the rigid body member. The strength member from each fiber optic cable is arranged along the outside surface of each end portion. The crimp sleeve is slid over the strength member on the end portion and crimped into place. This procedure is repeated at the other end of the rigid body member. The strain relief boot is then slid up over the crimp sleeve on each end until it snaps into place over the projections in each end portion.

The in-line splice protection device of the invention is particularly effective for protecting splices of single mode 3 mm fiber optic cable. The internal components protect the fusion splice from adverse environmental conditions and stress, particularly pulling. This makes the device extremely attractive for field installations. In conventional splicing applications, the splice must be secured in either a splice tray or splice enclosure. Because the device of the invention requires neither of these protective means, it can be installed almost anywhere in a fiber optic system.

The outside diameter of the device is only slightly larger than the diameter of the cable and generally under six inches in length. Because the strength member of the fiber optic cable is crimped in the same manner as in a fiber optic connector and a strain relief mechanism is placed on each end, the assembly can pass the stringent requirements of Bellcore GR-326-CORE side load tests. Over forty pounds of weight was hung axially from spliced cable with the in-line protection device of this invention without any change in signal attenuation.

Although described with respect to preferred embodiments of the invention, it should be readily understood that various changes and/or modifications may be made without departing from the spirit of the invention. In general, the invention is only intended to be limited by the scope of the following claims.

We claim:

1. An in-line protection device for a fiber optic splice comprising a rigid body member formed from two identical pieces having a central portion having an opening sized to house a fiber optic splice between two optical fibers from two fiber optic cables and end portions having openings to receive an optical fiber from a fiber optic cable, fastening means for fastening each fiber optic cable to each end portion of the body member and for holding the two pieces of the body member together and strain relief means connected to each end portion of said body member and extending over said fastening means and a portion of said fiber optic cable adjacent said end portion of the body member.

2. The device of claim 1, wherein said mating means comprises a groove running along one edge of one piece and a projection running along the corresponding edge of the other piece.

3. The device of claim 2, wherein each piece contains a groove running along an edge and a projection running along the other edge for engaging a corresponding projection and groove running along the edges of the other piece of the body member.

4. The device of claim 1, wherein said fastening means comprises a crimp sleeve disposed over the end portion of the body member and an adjacent portion of the fiber optic cable.

5. The device of claim 1, wherein the fiber optic cable includes a strength member, which is crimped between said crimp sleeve and said end portion of the body member.

6. The device of claim 5, wherein said end portions of the body member have indentations to accommodate the strength member when it is crimped between the crimp sleeve and end portion of the body member.

7. The device of claim 1, wherein said strain relief means is an elastomeric boot.

8. The device of claim 1, further comprising two optical fibers which have been fusion spliced together.

9. The device of claim 8, wherein said fusion spliced optical fibers are disposed within a protective sleeve.

10. The device of claim 9, wherein said protective sleeve is heat shrink plastic.

11. The device of claim 9, wherein said protective sleeve is a rigid plastic.

* * * * *